United States Patent
Baughman et al.

(10) Patent No.: US 8,996,886 B2
(45) Date of Patent: Mar. 31, 2015

(54) ENCRYPTED BIOMETRIC DATA MANAGEMENT AND RETRIEVAL

(75) Inventors: Aaron K. Baughman, Silver Spring, MD (US); Rudolf M. Bolle, Bedford Hills, NY (US)

(73) Assignee: International Business Machines Corporation, Armonk, NY (US)

(*) Notice: Subject to any disclaimer, the term of this patent is extended or adjusted under 35 U.S.C. 154(b) by 335 days.

(21) Appl. No.: 13/399,257

(22) Filed: Feb. 17, 2012

(65) Prior Publication Data

US 2013/0219193 A1 Aug. 22, 2013

(51) Int. Cl.
G06F 21/00 (2013.01)
G06F 11/30 (2006.01)
G06F 12/14 (2006.01)
G06F 7/04 (2006.01)
G06F 17/30 (2006.01)
(Continued)

(52) U.S. Cl.
CPC ............ *G06F 21/32* (2013.01); *G06F 21/6245* (2013.01)
USPC ................. 713/193; 713/186; 726/28; 726/19

(58) Field of Classification Search
CPC ............ H04L 9/3231; H04L 29/06809; H04L 2209/08; H04L 63/0861; G06F 21/32; G06F 21/6245; G06F 21/6254; H04W 12/06
USPC ................. 713/189, 193; 726/4–7, 17–19, 21, 726/26–30
See application file for complete search history.

(56) References Cited

U.S. PATENT DOCUMENTS 6,836,554 B1 12/2004 Bolle et al.
6,874,085 B1 3/2005 Koo et al.
(Continued)

FOREIGN PATENT DOCUMENTS

CN 101207488 A 6/2008
CN 101276384 A 10/2008
(Continued)

OTHER PUBLICATIONS

W. Stallings, Cryptography and Network Security Principles and Practices, 2006, Pearson Prentice Hall, 4th Ed., pp. 328-331 and 334-335.*

(Continued)

*Primary Examiner* — Shewaye Gelagay
*Assistant Examiner* — Trong Nguyen
(74) *Attorney, Agent, or Firm* — Douglas A. Lashmit; Hoffman Warnick LLC

(57) ABSTRACT

Aspects of the present invention provide a solution for managing and retrieving encrypted biometric data. A plurality of biometric entries is obtained and each one is encrypted with a unique non-invertible encryption function to get a plurality of encrypted biometric entries. A biometric measurement to be compared against the biometric entries is obtained, a predetermined noise is applied to the biometric measurement, and then the biometric measurement if encrypted using the non-invertible encryption function, resulting in a scrambled encrypted biometric. For each comparison, one of the encrypted biometric entries is subtracted from the scrambled encrypted biometric to get a calculated noise. This calculated noise is then compared with the predetermined noise to determine whether a match exists. Based on a determination that a match exists any information associated with the encrypted biometric entry is forwarded to the requestor.

11 Claims, 7 Drawing Sheets

(51) Int. Cl.

| | |
|---|---|
| G06F 12/00 | (2006.01) |
| G06F 13/00 | (2006.01) |
| H04N 7/16 | (2011.01) |
| G11C 7/00 | (2006.01) |
| G06F 21/32 | (2013.01) |
| G06F 21/62 | (2013.01) |

(56) References Cited

U.S. PATENT DOCUMENTS

| | | | |
|---|---|---|---|
| 7,438,233 | B2 | 10/2008 | Leiper |
| 8,272,050 | B2 | 9/2012 | Kotani et al. |
| 2004/0078587 | A1 | 4/2004 | Brackett et al. |
| 2004/0199765 | A1 | 10/2004 | Kohane et al. |
| 2006/0116908 | A1 | 6/2006 | Dew et al. |
| 2006/0123241 | A1* | 6/2006 | Martinian et al. .......... 713/186 |
| 2006/0293925 | A1* | 12/2006 | Flom ............... 705/3 |
| 2007/0245144 | A1 | 10/2007 | Wilson |
| 2008/0209226 | A1* | 8/2008 | Venkatesan et al. .......... 713/186 |
| 2008/0222496 | A1* | 9/2008 | Tuyls et al. ............ 714/777 |
| 2009/0037224 | A1 | 2/2009 | Raduchel |
| 2009/0177939 | A1* | 7/2009 | Chabanne ............ 714/752 |
| 2009/0271634 | A1 | 10/2009 | Boult et al. |
| 2009/0287930 | A1* | 11/2009 | Nagaraja ............ 713/171 |
| 2010/0014655 | A1* | 1/2010 | Chmora et al. ............ 380/28 |
| 2010/0241595 | A1 | 9/2010 | Felsher |
| 2011/0113038 | A1 | 5/2011 | Corbin et al. |
| 2011/0302021 | A1* | 12/2011 | Reid et al. ............ 705/14.35 |

FOREIGN PATENT DOCUMENTS

| | | |
|---|---|---|
| CN | 101383701 A | 3/2009 |
| EP | 1742134 A1 | 1/2007 |
| WO | 2008122236 A1 | 10/2008 |
| WO | 2011058124 A1 | 5/2011 |

OTHER PUBLICATIONS

International Application No. PCT/IB2013/050645, PCT International Search Report and the Written Opinion of the International Searching Authority, Jul. 4, 2013, 8 pages.

Ohrn et al., "Using Boolean Reasoning to Anonymize Databases," 1999, pp. 1-15, Artificial Intelligence in Medicine, vol. 5, No. 3, Publisher: Elsevier, Databas: INSPEC.

Chen, "A Survey of Indexing and Retrieval of Multimodal Documents: Text and Images," Feb. 2006, pp. 1-40, Technical Report 2006-505.

Davida et al., "On the Relation of Error Correction and Cryptography to an Off Line Biometric Based Identification Scheme," Nov. 1998, pp. 1-10, In Proceedings of WCC99 Workshop and Coding and Cryptography.

Goh et al., "Computation of Cryptographic Keys from Face Biometrics," 2003, pp. 1-13, IFIF: International Federation for Information Processing.

Ratha et al., "Generating Cancelable Fingerprint Templates," Apr. 2007, pp. 561-572, IEEE Transactions on Pattern Analysis and Machine Intelligence, vol. 29, No. 4.

Ratha et al., "Enhancing Security and Privacy in Biometrics-Based Authentication Systems," 2001, pp. 614-634, IBM Systems Journal, vol. 40, No. 3.

Tuyls et al., "Practical Biometric Authentication with Template Protection," 2005, pp. 436-446, AVBPA 2005, LNCS 3546.

Wayman, "Identity Management: Biometrics in Identity Management Systems," 2008, pp. 30-37, IEEE Security & Privacy, Published by the IEEE Computer Society.

Chikkerur et al., "Generating Registration-Free Cancelable Fingerprint Templates," 2008, 6 pages, IEEE 2008.

Bolle et al., "Using the Bootstrap for Error Analysis of Pattern Recognition Systems," Jan. 2004, pp. 1-31, Computer Vision and Image Understanding Journal, vol. 93, Issue 1.

Farooq et al., "Anonymous and Revocable Fingerprint Recognition," Jun. 2007, 7 pages, Computer Vision and Pattern Recognition 2007.

Great Britain Intellectual Property Office, Examination Report under Section 18(3) for Application No. GB1414383.8 dated Aug. 29, 2014, 3 pages.

IBM United Kingdom Limited, Reply to Examination Report under Section 18(3) for Application No. GB1414383.8 dated Sep. 8, 2014, 2 pages.

* cited by examiner

ENCRYPTED BIOMETRIC DATA MANAGEMENT AND RETRIEVAL

FIELD OF THE INVENTION

The subject matter of this invention relates generally to computer data access. More specifically, aspects of the present invention provide a system and method for managing and retrieving encrypted data, such as in a medical records environment.

BACKGROUND OF THE INVENTION

In the information technology environment of today, the use of biometric data is becoming increasingly more prevalent. Biometric data contains information that is based on traits that are intrinsic to the owner. Some examples of biometric data include DNA, fingerprint, aspects of the hand, facial aspects, aspects of the eye, movement aspects, scent and/or voice aspects. The use of such data is often preferred due to the absolute correlation that can be achieved between the data and the owner of the biometric.

However, this advantage in the use of biometric data can also lead to serious concerns. In an information technology environment, biometric data can be converted into a form that a computer device can interpret, such as a digital representation of the biometric data. In the case that this representation is not adequately secured, this representation can be retrieved by an unauthorized individual. In such a case, other data about the individual can be compromised due to the correlative nature of the biometric data to the individual associated therewith.

These concerns can be particularly relevant when biometric data is needed in order to conduct a search. In such an environment, one must be concerned with security of the biometric data during transmittal of the data over communication lines. In addition, it is often difficult to ascertain the level of security present in the location that contains the data that needs to be searched.

SUMMARY OF THE INVENTION

In general, aspects of the present invention provide a solution for managing and retrieving encrypted biometric data. A plurality of biometric entries is obtained and each one is encrypted with a unique non-invertible encryption function to get a plurality of encrypted biometric entries. A biometric measurement to be compared against the biometric entries is obtained, a predetermined noise is applied to the biometric measurement, and then the biometric measurement if encrypted using the non-invertible encryption function, resulting in a scrambled encrypted biometric. For each comparison, one of the encrypted biometric entries is subtracted from the scrambled encrypted biometric to get a calculated noise. This calculated noise is then compared with the predetermined noise to determine whether a match exists. Based on a determination that a match exists any information associated with the encrypted biometric entry is forwarded to the requestor.

A first aspect of the invention provides a method for retrieving encrypted biometric data, comprising: obtaining a biometric measurement; applying a predetermined noise to the biometric measurement to get a scrambled biometric, the noise being a cancelable technology component; encrypting the scrambled biometric with a non-invertible encryption function to get a scrambled encrypted biometric; accessing a data storage having a plurality of encrypted biometric entries, the encrypted biometric entries being encrypted with the non-invertible encryption function; subtracting an encrypted biometric entry of the plurality of encrypted biometric entries from the scrambled encrypted biometric to get a calculated noise; comparing the calculated noise with the predetermined noise to determine whether a match exists; and based on a determination that the match exists, receiving information associated with the encrypted biometric entry.

A second aspect of the invention provides a method for managing encrypted biometric data, comprising: obtaining a plurality of biometric entries; encrypting each of the plurality of biometric entries with a non-invertible encryption function to get a plurality of encrypted biometric entries; obtaining a scrambled encrypted biometric, the scrambled encrypted biometric being a biometric measurement to which a predetermined noise has been applied encrypted with the non-invertible function; subtracting an encrypted biometric entry of the plurality of encrypted biometric entries from the scrambled encrypted biometric to get a calculated noise; comparing the calculated noise with the predetermined noise to determine whether a match exists; and based on a determination that the match exists, sending information associated with the encrypted biometric entry.

A third aspect of the invention provides a system for managing encrypted biometric data, comprising a computer system having at least one computer device that performs a method, comprising: obtaining a plurality of biometric entries; encrypting each of the plurality of biometric entries with a non-invertible encryption function to get a plurality of encrypted biometric entries; obtaining a scrambled encrypted biometric, the scrambled encrypted biometric being a biometric measurement to which a predetermined noise has been applied encrypted with the non-invertible function; subtracting an encrypted biometric entry of the plurality of encrypted biometric entries from the scrambled encrypted biometric to get a calculated noise; comparing the calculated noise with the predetermined noise to determine whether a match exists; and based on a determination that the match exists, sending information associated with the encrypted biometric entry.

A fourth aspect of the present invention provides a computer program product embodied in a computer readable storage medium which, when executed, performs a method for managing encrypted biometric data, the method comprising: obtaining a plurality of biometric entries; encrypting each of the plurality of biometric entries with a non-invertible encryption function to get a plurality of encrypted biometric entries; obtaining a scrambled encrypted biometric, the scrambled encrypted biometric being a biometric measurement to which a predetermined noise has been applied encrypted with the non-invertible function; subtracting an encrypted biometric entry of the plurality of encrypted biometric entries from the scrambled encrypted biometric to get a calculated noise; comparing the calculated noise with the predetermined noise to determine whether a match exists; and based on a determination that the match exists, sending information associated with the encrypted biometric entry.

A fifth aspect of the present invention provides a method for deploying an application for managing and retrieving encrypted biometric data, comprising, providing a computer system operable to: obtain a plurality of biometric entries; encrypt each of the plurality of biometric entries with a non-invertible encryption function to get a plurality of encrypted biometric entries; obtain a scrambled encrypted biometric, the scrambled encrypted biometric being a biometric measurement to which a predetermined noise has been applied encrypted with the non-invertible function; subtract an encrypted biometric entry of the plurality of encrypted biometric entries from the scrambled encrypted biometric to get a calculated noise; compare the calculated noise with the predetermined noise to determine whether a match exists; and based on a determination that the match exists, send information associated with the encrypted biometric entry.

Still yet, any of the components of the present invention could be deployed, managed, serviced, etc., by a service provider who offers to manage and/or retrieve one or more encrypted biometrics.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
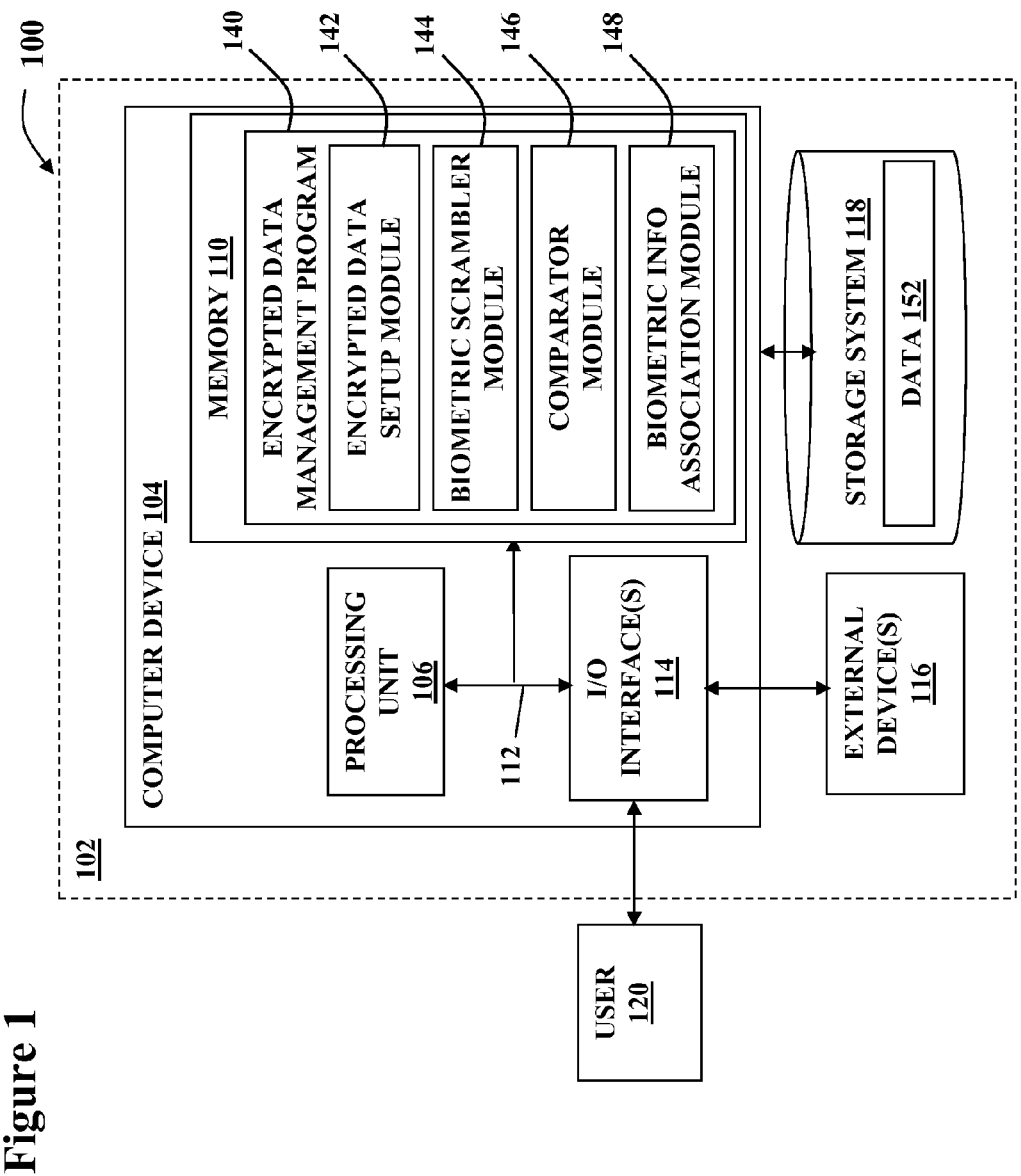
FIG. 1 shows a data processing system suitable for implementing embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the present invention provide a solution for managing and retrieving encrypted biometric data. A plurality of biometric entries is obtained and each one is encrypted with a unique non-invertible encryption function to get a plurality of encrypted biometric entries. A biometric measurement to be compared against the biometric entries is obtained, a predetermined noise is applied to the biometric measurement, and then the biometric measurement if encrypted using the non-invertible encryption function, resulting in a scrambled encrypted biometric. For each comparison, one of the encrypted biometric entries is subtracted from the scrambled encrypted biometric to get a calculated noise. This calculated noise is then compared with the predetermined noise to determine whether a match exists. Based on a determination that a match exists any information associated with the encrypted biometric entry is forwarded to the requestor.

Turing to the drawings, FIG. 1 shows an illustrative environment 100 for managing and retrieving encrypted biometric data. To this extent, environment 100 includes a computer system 102 that can perform a process described herein in order to manage and retrieve encrypted biometric data. In particular, computer system 102 is shown including a computer device 104 that includes an encrypted data management program 140, which makes computing device 104 operable to manage and retrieve encrypted biometric data by performing a process described herein.

Computing device 104 is shown including a processing unit 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing unit 106 executes program code, such as encrypted data management program 140, which is at least partially fixed in memory 110. Memory 110 can also include local memory employed during actual execution of the program code, bulk storage (storage 118), and cache memories (not shown) which provide temporary storage of at least some program code in order to reduce the number of times code must be retrieved from storage system 118 during execution. While executing program code, processing unit 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, encrypted data management program 140 can manage a set of interfaces (e.g., graphical user interface(s), application program interface, and/or the like) that enable human and/or system users 120 to interact with encrypted data management program 140. Further, encrypted data management program 140 can manage (e.g., store, retrieve, create, manipulate, organize, present, etc.) data 152 using any solution.

In any event, computer system 102 can comprise one or more general purpose computing articles of manufacture 104 (e.g., computing devices) capable of executing program code, such as encrypted data management program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, encrypted data management program 140 can be embodied as any combination of system software and/or application software. In any event, the technical effect of computer system 102 is to provide processing instructions to computing device 104 in order to manage and retrieve encrypted biometric data.

Further, encrypted data management program 140 can be implemented using a set of modules 142-148. In this case, a module 142-148 can enable computer system 102 to perform a set of tasks used by encrypted data management program 140, and can be separately developed and/or implemented apart from other portions of encrypted data management program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing unit 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of encrypted data management program 140 fixed thereon (e.g., one or more modules 142-148). However, it is understood that computer system 102 and encrypted data management program 140 are only representative of various possible equivalent computer systems that may perform a process described herein. To this extent, in other embodiments, the functionality provided by computer system 102 and encrypted data management program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, encrypted data management program 140 enables computer system 102 to manage and retrieve encrypted biometric data. To this extent, encrypted data management program 140 is shown including an encrypted data setup module 142, a biometric scrambler module 144, a comparator module 146, and a biometric information association module 148.

Figure 2:
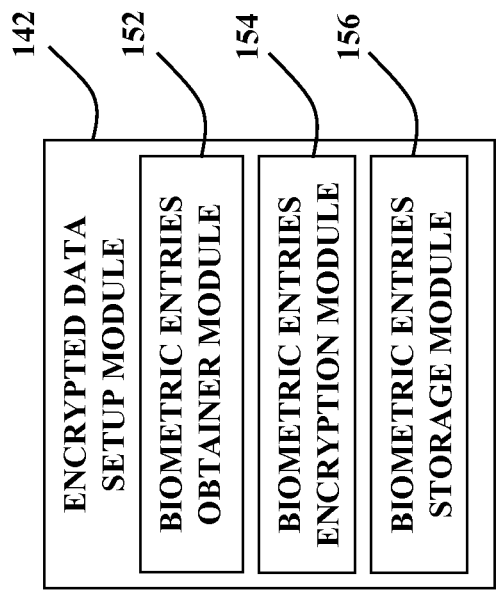
FIG. 2 shows a set of modules included in data setup module according to embodiments of the invention.

Referring now to FIG. 2 in conjunction with FIG. 1, a set of modules 152-156 that can be included in data setup module 142 according to an embodiment of the invention is shown. Encrypted data setup module 142 can utilize one or more of these modules 152-156 to setup a database of encrypted data for use by encrypted data management program 140. To this extent, encrypted data setup module 142 can include a biometric entries obtainer module 152, a biometric entries encryption module 154 and a biometric entries storage module 156.

Figure 3:
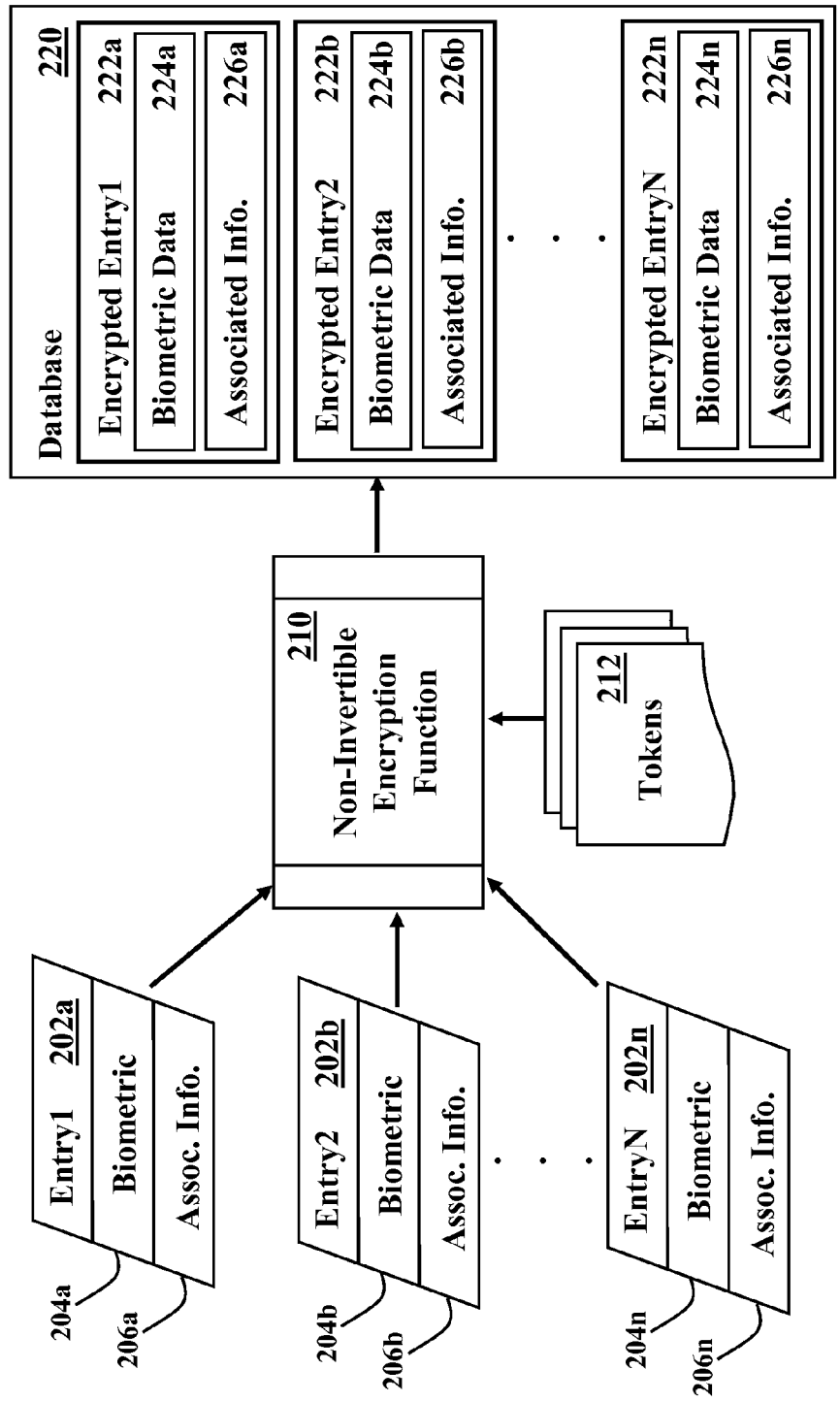
FIG. 3 shows a diagram illustrating the functions of the data setup module according to embodiments of the invention.

Referring now to FIG. 3 in conjunction with FIG. 2, a diagram 200 illustrating the functions of encrypted data setup module 142 according to an embodiment of the invention is shown. To this extent, encrypted data setup module 142 can facilitate the data collection for the invention and the ingestion of non-invertible encryptions of user population into database 220. To do so, biometric entries obtainer module 152 can obtain a plurality of biometric entries (enrolled subjects) 202$a$-$n$ for use in a database 220. Each of biometric entries 202$a$-$n$ can include a biometric 204$a$-$n$. Biometric 204$a$-$n$ can be any source of biometric data, including but not limited to DNA, fingerprint, aspects of the hand, facial aspects, aspects of the eye, movement aspects, scent and/or voice aspects. In the case of medical applications, biometric 204$a$ can include such things as a blood sample, a tissue sample, a medical image, etc. To this extent, biometric entries obtainer module 152 may employ any solution now known or later developed for obtaining biometric data or any other similar type of data, including but not limited to: a medical imaging device, a finger and/or hand scanner, a non-medical imaging device, a blood and/or tissue sampling device, a DNA scanner, etc. Biometric 204$a$-$n$ can then be aligned in a manner that is common with other biometrics and digitized.

In addition to biometric 204$a$-$n$, biometric entries 202$a$-$n$ can also include associated information 206$a$-$n$. Associated information 206$a$-$n$ can include any information that pertains to an owner of biometric 204$a$-$n$. To this extent, associated information 206$a$-$n$ can include information that can only be obtained through the use of biometric 204$a$-$n$. In any case, associated information 206$a$-$n$ can include sensitive information such as financial information or medical information with respect to the owner of biometric 204$a$-$n$.

In the case that associated information 206$a$-$n$ includes medical information, associated information 206$a$-$n$ can include information that provides characteristics of the owner of biometric and/or medical data 204$a$-$n$ with or without actually identifying the owner, including but not limited to: height, weight, age, body mass index (BMI), blood pressure, bloodwork information, etc. Additionally, or in the alternative, associated information 206$a$-$n$ can include information directly pertaining to and/or describing characteristics of the associated biometric 204$a$-$n$. For example, in the case that a particular biometric 204$a$ includes a tissue sample, associated information 206$a$ can provide information as to the location from which the cells were obtained, whether the cells were determined to have abnormalities, such as a tumor, and/or whether the cells were indicated as having cancerous elements. To this extent, associated information 206$a$-$n$ can include measurements, observations, analysis, descriptions, diagnoses, and/or any other information that might serve to provide information regarding biometric 204$a$-$n$.

Continuing to refer to FIG. 3 in conjunction with FIG. 2, in any case, once entries 102$a$-$n$ are obtained by biometric entries obtainer module 152, biometric entries encryption module 154 encrypts each of the plurality of biometric entries 152$a$-$n$ with a non-invertible encryption function 210. It should be understood that not all of biometric entries 202$a$-$n$ must be encrypted during the same time period. Rather, each individual biometric entry 202$i$ can be encrypted as it is obtained by entries obtainer module 152. In any case, non-invertible encryption function 210, when applied to one biometric entry 202$a$-$n$, yields an encrypted record 222$a$-$n$. Further, because an encrypted record 222$a$-$n$ can include biometric data 224$a$ and associated information 226$a$, encrypted record 222$a$-$n$ can be classified as a stochastic encryption.

In any case, non-invertible encryption function 210 used by biometric entries encryption module 154 to generate encrypted records 222$a$-$n$ can be any non-invertible encryption function now known or later developed. Functions of this type can include those known in the art as cancelable and anonymous biometrics, or encryption. For example, one or more tokens 212 configured to create randomness can be applied to biometric 204$a$-$n$, which would represent the digitized output of biometric sensors. The same one of tokens 212 or a different token 212 could be applied to associated information 226$a$ to mask it as well. Ideally, the token 212 used by non-invertible encryption function 210 yields a unique result, such that each encrypted record 222$a$-$n$ is unique from any other encrypted record 222$a$-$n$. In any case, for each encrypted biometric/stochastic data, separate, unique token of tokens 212 can be used. This token is used to generate a non-invertible transform using non-invertible encryption function 210. When new data comes in, the same token can be used to encrypt the additional data separately or encrypt the whole data file again. A greater volume of data can make this encryption more difficult to break, so the use of multiple tokens 212 is often practiced.

Figure 4:
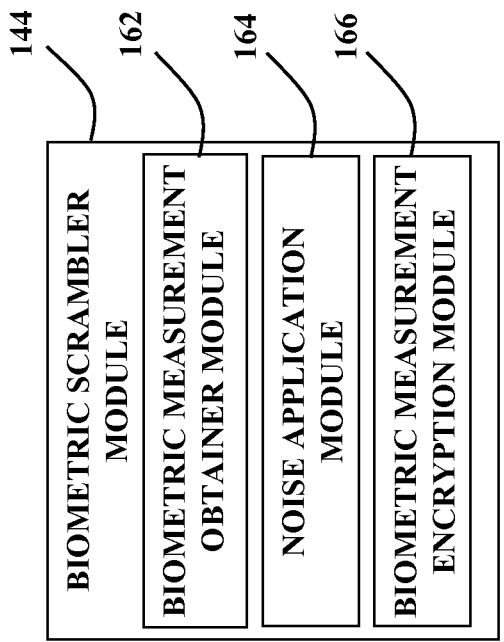
FIG. 4 shows a set of modules that can be included in a biometric scrambler module according to embodiments of the invention.
Figure 5:
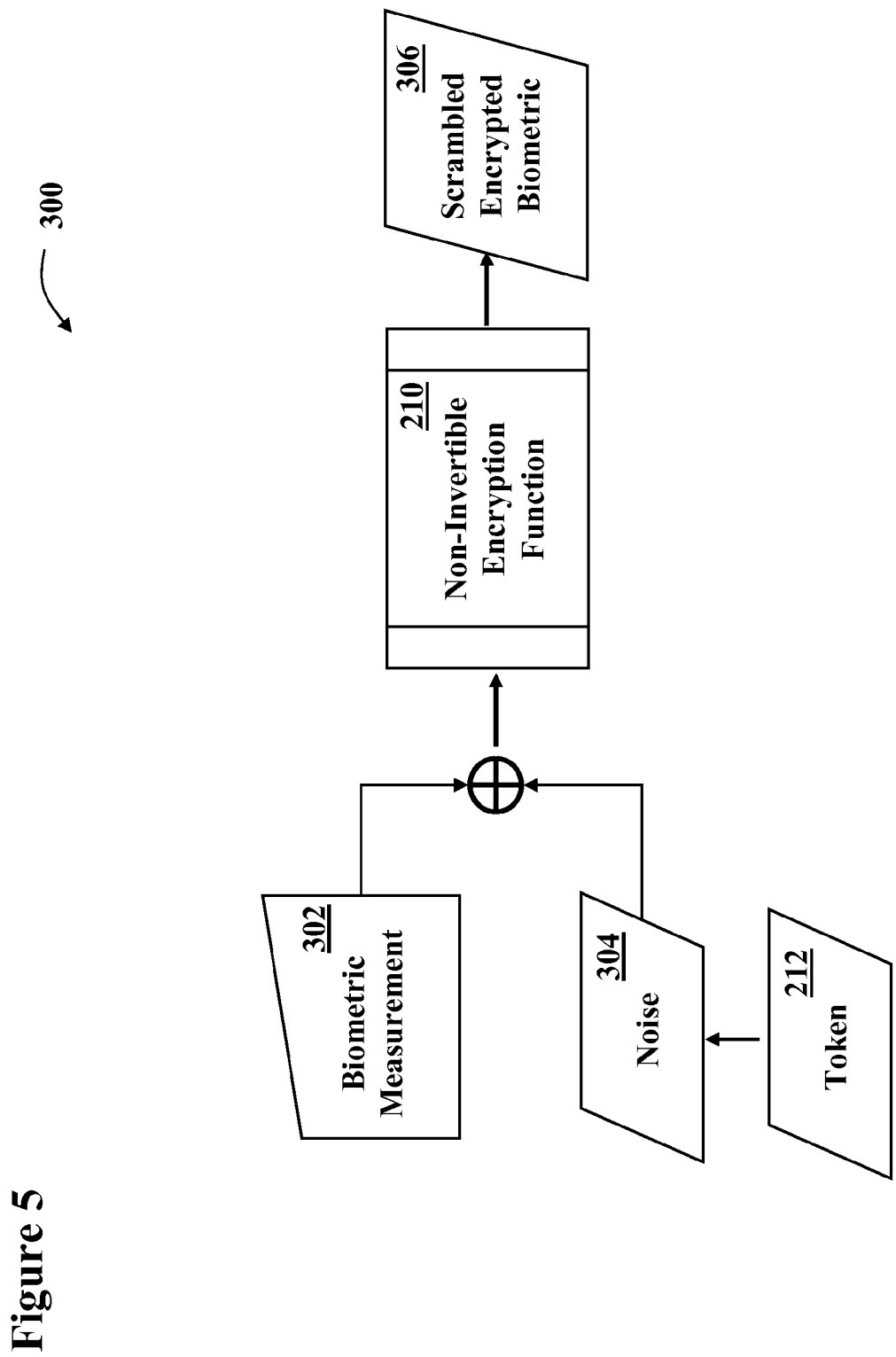
FIG. 5 shows a diagram illustrating the functions of a biometric scrambler module according to embodiments of the invention.

Once biometric entries encryption module 154 has created encrypted records 222*a-n*, biometric entries storage module 156 stores encrypted records 222*a-n* in a database 220. It should be understood that biometric entries storage module 156 could employ any solution now known or later developed for storing encrypted records 222*a-n* in database 220. For example, biometric data 224*a-n* and associated information 226*a-n* can be stored as a single combined entity or, in the alternative associated information 226*a-n* can be stored separately from biometric data 224*a-n*, while still requiring biometric data 224*a-n* for retrieval. It should be noted that FIGS. 1-3 describe the generic architecture for encrypting data using some generic non-invertible (cancelable, anonymous) encryption, including those invented and to be invented. FIGS. 4-5 describe the encryption where the non-invertible is achieved (or described) by adding randomness.

Referring now to FIG. 4 in conjunction with FIG. 1, a set of modules 162-166 that can be included in biometric scrambler module 144 according to an embodiment of the invention is shown. Biometric scrambler module 144 can utilize one or more of these modules 162-166 to generate a scrambled encrypted biometric for a comparison against database 220 (FIG. 3). To this extent, biometric scrambler module 144 can include a biometric measurement obtainer module 162, a noise application module 164 and a biometric measurement encryption module 166.

Referring now to FIG. 5 in conjunction with FIG. 4, a diagram illustrating the functions of biometric scrambler module 144 according to an embodiment of the invention is shown. Biometric measurement obtainer module 162 obtains a biometric measurement 302 for comparing against encrypted records 222*a-n* in database 220 (FIG. 3). Biometric measurement 302 is obtained independently from biometric entries 202*a-n* and the owner of biometric measurement 302 may not have a biometric entry 202*a-n* in database 220. However, as with biometric entries 202*a-n*, biometric measurement 302 can be any source of biometric data, including but not limited to DNA, fingerprint, aspects of the hand, facial aspects, aspects of the eye, movement aspects, scent and/or voice aspects. In the case of medical applications, biometric 302 can include such things as a blood sample, a tissue sample, a medical image, etc. To this extent, biometric measurement obtainer module 162 can employ any solution now known or later developed for obtaining biometric data, including but not limited to: a medical imaging device, a finger and/or hand scanner, a non-medical imaging device, a blood and/or tissue sampling device, a DNA scanner, etc. However, unlike biometric entries 202*a-n,* biometric measurement 302 may not have associated information 204*a-n* (FIG. 3).

In any case, once biometric measurement 302 is obtained by biometric measurement obtainer module 162, noise application module 164 applies a predetermined noise 304 to biometric measurement 302. Predetermined noise 304 should not be confused with background noise that is often present in biometric measurements such as biometric measurement 302 and biometrics 204*a-n*. Such background noise is often the result of the impreciseness of the scanners used to obtain biometric measurements. This impreciseness can be because of different scanners being used or in differing measurements being taken by the same scanner. Further, background noise may be the result of changing conditions of the biometric itself and/or the environment surrounding the biometric. Further, loss incurred in converting the biometric to digital data may contribute to the background noise. In contrast, it should be understood that predetermined noise 304 is configured to create randomness in biometric measurement 302 to prevent biometric measurement 302 from being easily interpreted by unauthorized users. To this extent, predetermined noise 304 can be determined using a hash function. In the alternative, predetermined noise can be determined using any solution now known or later developed. For the purposes of this invention, biometric measurement 302 to which noise has been applied will be referred to as a scrambled biometric.

Once biometric measurement 302 has been scrambled by noise application module 164 using noise 304, biometric measurement encryption module 166 encrypts the scrambled biometric measurement 304 with non-invertible encryption function 210. It should be recognized that non-invertible encryption function 210 used to encrypt scrambled biometric measurement 302 is the same encryption function 210 (FIG. 3) used to encrypt biometric entries 202*a-n*. As such, non-invertible encryption function 210 used by biometric measurement encryption module 166 to generate scrambled encrypted biometric 306 can be any non-invertible function now known or later developed. For example, a different token 212 than applied to biometric entries 202*a-n* can be applied to scrambled biometric measurement 302. In any case, non-invertible encryption function 210, when applied to biometric measurement, yields a scrambled encrypted biometric 306.

Figure 6:
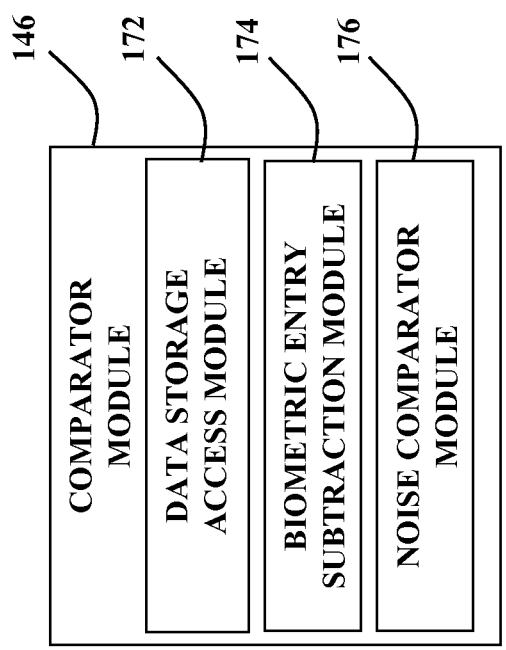
FIG. 6 shows a set of modules that can be included in a data setup module according to embodiments of the invention.

Referring now to FIG. 6 in conjunction with FIG. 1, a set of modules 172-176 that can be included in comparator module 146 according to an embodiment of the invention is shown. Comparator module 142 can utilize one or more of these modules 172-176 to compare scrambled encrypted biometric 306 (FIG. 5) with encrypted records 222*a-222n* (FIG. 3) in database 220 (FIG. 3). To this extent, comparator module 146 can include a data storage access module 172, a biometric entry subtraction module 174 and a noise comparator module 176. The representation of encrypted biometric 222*a-n* can be referred to as noise because it looks like noise as opposed to discernable data. However, it should be understood that associated info 226*a-n* about the biometric is present in the representations Referring now to FIG. 7 in conjunction with FIG. 6, a diagram illustrating the functions of comparator module 146 according to an embodiment of the invention is shown. To this extend, comparator module 146 can perform matching functions of the invention. To accomplish this, data storage access module 172 can access a data storage (e.g., database 220) having encrypted records 222*a-222n*. It should be understood that any communications and/or networking solution now known or later developed for data access can be employed.

Once database 220 has been accessed, biometric entry subtraction module 174 subtracts an encrypted biometric entry 222*a-n* from scrambled encrypted biometric 306. As stated previously, scrambled encrypted biometric 306 has been scrambled using predetermined noise 304 (FIG. 5) and then encrypted using non-invertible encryption function 210 (FIG. 5) by way of a unique token 212 (FIG. 5). Similarly, each instance of biometric data 224*a-n* in encrypted records 222*a-n* has been encrypted using the same non-invertible encryption function 210 (FIG. 3) by way of the tokens 212 (FIG. 3), which can be different or the same. However, the instances of biometric data 224*a-n* have not been subjected to predetermined noise 304 (FIG. 5) as has scrambled encrypted biometric 306. As such, subtraction of each one of biometric data 224a-n from scrambled encrypted biometric 306 will leave a unique noise 402a-n.

After one or more subtractions have occurred, noise comparator module 176 compares the calculated noise 402a-n with predetermined noise 304 (FIG. 5) to determine whether a match exists. Specifically, since both biometric 204a-n (FIG. 3) and biometric measurement 302 (FIG. 5) have been encrypted using non-invertible function 210 using tokens 212, if the original values of each were substantially equivalent, the noise 402a-n would be roughly equivalent to the predetermined noise 304. This is because the predetermined noise was originally incorporated into the original biometric measurement 302 but not the biometric entries 202a-n.

Figure 7:
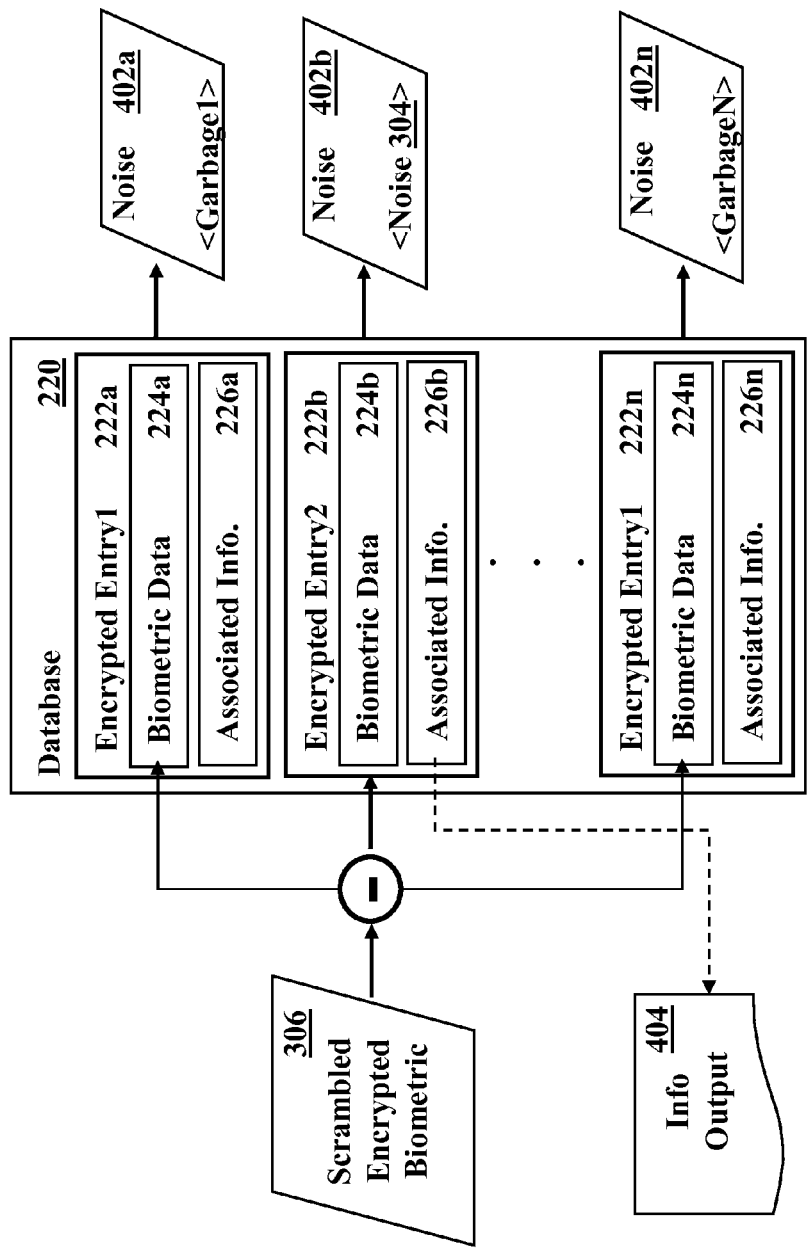
FIG. 7 shows a diagram illustrating the functions of a comparator module according to embodiments of the invention.

For example, as shown in FIG. 7, the subtraction of biometric data 224b from scrambled encrypted biometric 306 has yielded noise 402b that matches predetermined noise 304. Thus, encrypted record 222b can be classified as matching biometric measurement 302. In contrast, the subtraction of other biometric data 224a and 224n from scrambled encrypted biometric 306 has yielded noises 402a and 402n that do not match predetermined noise 304. Thus, encrypted record 222a and encrypted record 222n cannot be classified as matching biometric measurement 302.

While the above example, might seem to imply a 1:1 match between the calculated noise 402b and predetermined noise 304, it should be recognized that such a match may not be either likely or desired. Specifically, because, as stated above, either or both of the original biometric or the conditions surrounding the original biometric may change, the biometric measurement is likely to have some associated noise. Thus, even in the event that an exact match is sought, a certain tolerance must be introduced into the comparison. Further, in cases, such as in medical applications, in which the search is for biometrics with shared characteristics without respect to the owner of the biometric, the tolerance used must be wider than that for an exact match.

In using such a wide tolerance, applications can be developed in which certain biometric measurements 302 are introduced and database 220 is searched for biometric data 224a-n that have similar characteristics. For example, in the medical arena, a medical image can be used to search a database 220 that include similar medical images for certain characteristics contained in the medical image. However, since both the biometric measurement 302 and the biometric entries 202a-n have been encrypted, the entire search can be conducted with diminished risk that personal information regarding either owner will be compromised.

Referring now to FIG. 7 in conjunction with FIG. 1, once a match has been established, biometric data association module 148 can retrieve associated information 226b that is associated with the matched biometric data 224b from database 220. This associated information 226b can then be sent as output 404 to the requesting party. Associated information 226b can be sent in an encrypted form, for decryption by the requestor, or, in the alternative, can be sent in plaintext form. Further, output can be transmitted using any solution now known or later developed. Upon receipt of output 404, analysis can be performed on the associated information 226b. This analysis can take the form of manual analysis or can be performed with an automatic analyzer. For example, in the case that the search was performed on a medical database for diagnostic purposes, the returned output 404 could include one or records having analysis of patients with medical conditions similar to that indicated in the original biometric measurement 302.

While shown and described herein as a method and system for managing and retrieving encrypted biometric data, it is understood that aspects of the invention further provide various alternative embodiments. For example, in one embodiment, the invention provides a computer program fixed in at least one computer-readable medium, which when executed, enables a computer system to manage and retrieve encrypted biometric data. To this extent, the computer-readable medium includes program code, such as encrypted data management program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as encrypted data management program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing and retrieving encrypted biometric data. In this case, a computer system, such as computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A method for retrieving encrypted biometric data, comprising:
   obtaining a biometric measurement;
   applying a predetermined noise to the biometric measurement to get a scrambled biometric, the noise being a cancelable technology component determined using a hash function and different from background noise and encryption key;
   encrypting the scrambled biometric with a non-invertible encryption function to get a scrambled encrypted biometric;
   accessing a data storage having a plurality of encrypted biometric entries, the encrypted biometric entries being encrypted with the non-invertible encryption function;
   subtracting an encrypted biometric entry of the plurality of encrypted biometric entries from the scrambled encrypted biometric to get a calculated noise;
   comparing the calculated noise with the predetermined noise to determine whether a match exists using a tolerance for the comparison between the calculated noise and the predetermined noise to determine whether the match exists;
   based on a determination that the match exists, receiving information associated with the encrypted biometric entry; and
   analyzing the information associated with the encrypted biometric entry, wherein analyzing is indicative of a medical condition indicated by the biometric measurement.

2. The method of claim 1, further comprising:
   obtaining record data, the record data having a biometric portion and associated information;
   encrypting the biometric portion of the record data using the non-invertible encryption function to get an encrypted biometric entry; and
   storing the encrypted biometric entry in the data storage prior to the accessing.

3. The method of claim 1, wherein each of the plurality of encrypted biometric entries includes medical data.

4. A method for managing encrypted biometric data, comprising:
   obtaining a plurality of biometric entries;
   encrypting each of the plurality of biometric entries with a non-invertible encryption function to get a plurality of encrypted biometric entries;
   obtaining a scrambled encrypted biometric, the scrambled encrypted biometric being a biometric measurement to which a predetermined noise has been applied prior to being encrypted with the non-invertible function, and the noise being a cancelable technology component determined using a hash function and different from background noise and encryption key;
   subtracting an encrypted biometric entry of the plurality of encrypted biometric entries from the scrambled encrypted biometric to get a calculated noise;
   comparing the calculated noise with the predetermined noise to determine whether a match exists using a tolerance for the comparison between the calculated noise and the predetermined noise to determine whether the match exists;
   based on a determination that the match exists, sending information associated with the encrypted biometric entry; and
   analyzing the information associated with the encrypted biometric entry, wherein analyzing is indicative of a medical condition indicated by the biometric measurement.

5. The method of claim 4, the obtaining further comprising:
   obtaining a biometric measurement;
   applying the predetermined noise to the biometric measurement to get a scrambled biometric; and
   encrypting the scrambled biometric with the non-invertible encryption function to get the scrambled encrypted biometric.

6. The method of claim 4, wherein each of the plurality of encrypted biometric entries includes medical data.

7. A system for managing encrypted biometric data, comprising a computer system having at least one computer device that performs a method, comprising:
   obtaining a plurality of biometric entries;
   encrypting each of the plurality of biometric entries with a non-invertible encryption function to get a plurality of encrypted biometric entries;
   obtaining a scrambled encrypted biometric, the scrambled encrypted biometric being a biometric measurement to which a predetermined noise has been applied prior to being encrypted with the non-invertible function, and the noise being a cancelable technology component determined using a hash function and different from background noise and encryption key;
   subtracting an encrypted biometric entry of the plurality of encrypted biometric entries from the scrambled encrypted biometric to get a calculated noise;
   comparing the calculated noise with the predetermined noise to determine whether a match exists using a tolerance for the comparison between the calculated noise and the predetermined noise to determine whether the match exists;
   based on a determination that the match exists, sending information associated with the encrypted biometric entry; and
   analyzing the information associated with the encrypted biometric entry, wherein analyzing is indicative of a medical condition indicated by the biometric measurement.

8. The system of claim 7, the obtaining further comprising:
   obtaining a biometric measurement;
   applying the predetermined noise to the biometric measurement to get a scrambled biometric; and
   encrypting the scrambled biometric with the non-invertible encryption function to get the scrambled encrypted biometric.

9. The system of claim 7, wherein each of the plurality of encrypted biometric entries includes medical data.

10. A computer program product embodied in a non-transitory computer readable medium which, when executed, performs a method for managing encrypted biometric data, the method comprising:
   obtaining a plurality of biometric entries;
   encrypting each of the plurality of biometric entries with a non-invertible encryption function to get a plurality of encrypted biometric entries;
   obtaining a scrambled encrypted biometric, the scrambled encrypted biometric being a biometric measurement to which a predetermined noise has been applied prior to being encrypted with the non-invertible function, and the noise being a cancelable technology component determined using a hash function and different from background noise and encryption key;

subtracting an encrypted biometric entry of the plurality of encrypted biometric entries from the scrambled encrypted biometric to get a calculated noise;

comparing the calculated noise with the predetermined noise to determine whether a match exists using a tolerance for the comparison between the calculated noise and the predetermined noise to determine whether the match exists;

based on a determination that the match exists, sending information associated with the encrypted biometric entry; and analyzing the information associated with the encrypted biometric entry, wherein analyzing is indicative of a medical condition indicated by the biometric measurement.

11. The computer program product of claim 10, wherein each of the plurality of encrypted biometric entries includes medical data.

\* \* \* \* \*